W. F. Ketchum.
Mower.
№ 259 Reissued Feb. 28, 1854
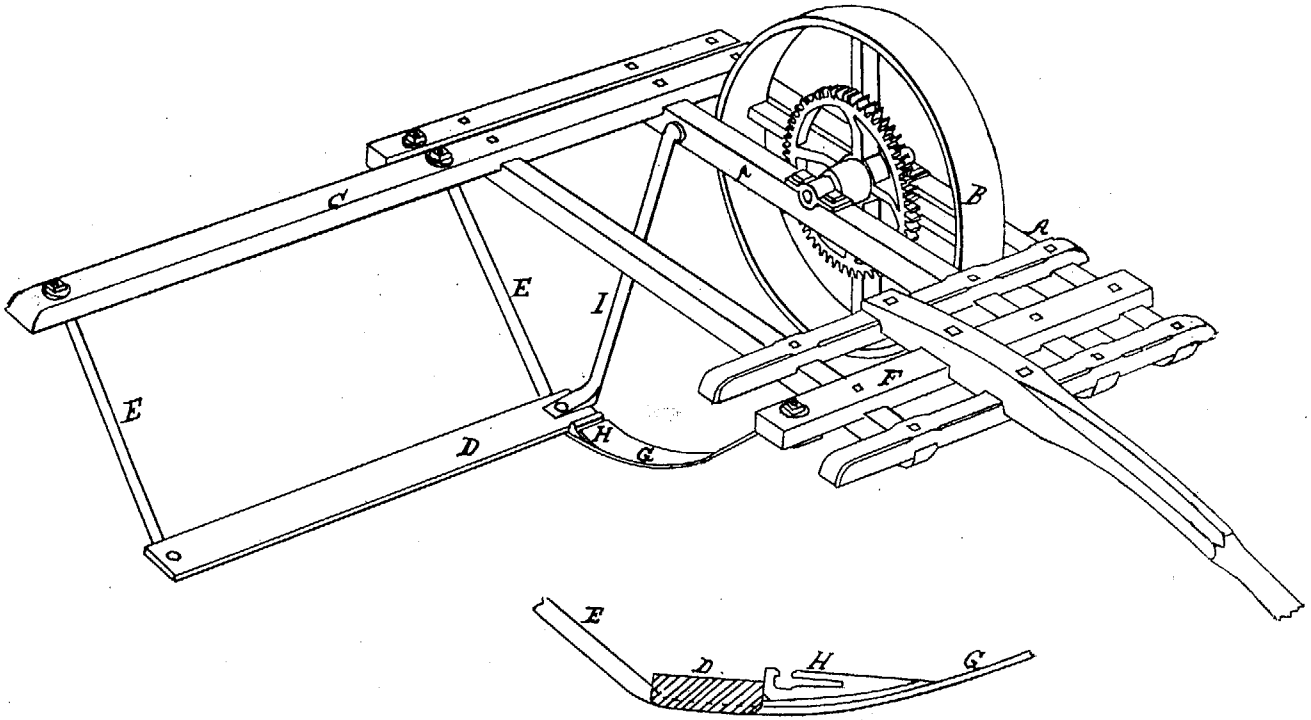

UNITED STATES PATENT OFFICE.

WILLIAM F. KETCHUM, OF BUFFALO, NEW YORK.

IMPROVEMENT IN GRASS-HARVESTERS.

Specification forming part of Letters Patent No. 8,724, dated February 10, 1852; Reissue No. 259, dated February 28, 1854.

*To all whom it may concern:*

Be it known that I, WILLIAM F. KETCHUM, of the city of Buffalo, in the county of Erie and State of New York, (assignor to RUFUS L. HOWARD, of the same place,) have invented new and useful Improvements in Grass and Grain Cutting Machines; and I do hereby declare that the following is a full and exact description thereof, reference being had to the drawings accompanying the Letters Patent herewith surrendered, and to the letters of reference marked thereon.

One of my improvements consists in projecting a stout bar, C, from the frame, parallel with but behind and above the rack, at a sufficient height to clear the grass, and projecting down from it slim iron braces to the rack D in a line with the course of the machine, so that they will not clog, while they sustain the rack.

My second improvement consists in connecting a shield-plate, G, with the shoe H. Said shield-plate may be supported by any convenient part of the frame in the front part of the machine. This is a broad plate. I use sheet-iron, that passes over the short stubble or loose grass, and treads it down where the end of the cutter-bar is working, so that the grass will not be caught in the moving joint and clog the machine. This may be connected with the frame or not, but is to be used in combination with the shoe and cutter-bar for the purposes aforesaid.

It is apparent that in operating a mowing or reaping machine, where there is but one main wheel which operates the gearing, and where the cutter-bar is on one side of the machine, there will be a side draft if the pole is attached directly in front of the driving or main wheel, which will tend to force the team toward the standing grass, and drag the machine too far into it, and will greatly increase the labor of the team.

My third improvement for remedying this difficulty consists in placing the pole, to which the horses are attached, on the frame on the same side of the main wheel that the cutter-bar is placed, and so far on that side as to equalize, as near as may be, the draft of the machine, as shown in the said drawings.

It is obvious that the point at which the pole should be attached to the frame depends upon circumstances, which are somewhat variable—such as the length of cutter-bar, the distance of the heel of the cutter from the plane of the wheel, the kind of grass or grain to be cut, &c.—and therefore no precise point of attachment can be designated as best answering the purpose in all cases. As my machine is constructed I attach the pole about one foot inside of the path of the wheel. Several inches nearer or farther from the path of the wheel would be useful as points of attachment; but I prefer nearly the point above designated.

Having thus fully described my improvements, what I claim as my invention, and desire to secure by Letters Patent, is—

1. Sustaining the outer end of the rack-piece D in the manner set forth.

2. The shield-plate G, in combination with the shoe and cutter-bar, for the purposes aforesaid.

WILLIAM F. KETCHUM.

Witnesses:

H. U. TOPER,

JNO. C. FIELD.